Patented May 31, 1938

2,118,805

UNITED STATES PATENT OFFICE 2,118,805

PROCESS OF REFINING WHITE OILS

Manuel Blumer and Leo Salzmann, Butler, Pa., assignors to L. Sonneborn Sons, Inc., a corporation of Delaware No Drawing. Application April 6, 1935, Serial No. 15,093

2 Claims. (Cl. 196—40)

This invention relates to medicinal oils and more particularly to a method of removing sulphur containing compounds from the acidified oil and obtaining an oil of high stability.

Certain highly refined petroleum products, such as for example, white lubricating oils, medicinal oils, are produced by treatment of a petroleum distillate with sulphuric acid or oleum. In treating such a distillate, it is ordinarily mixed and agitated with fuming sulphuric acid. The concentration of fuming acid employed may vary from several percent of uncombined $SO_3$ to pure sulphuric anhydride, and all such concentrations, including the anhydride, may be hereinafter embraced by the term "fuming sulphuric acid". The amount of fuming sulphuric acid applied may vary for any individual treatment from three to about twenty percent by volume of the original quantity of oil treated. After agitating the distillate and acid together, the mixture is permitted to settle; whereupon a heavy greenish to black colored sludge separates as a lower layer and may be withdrawn. This sludge contains unconsumed sulphuric acid, together with certain organic acids derived from the reaction of the fuming sulphuric acid with the oil. These organic acids may compose from 25%–75% of the sludge, depending upon the oil treated, mode of treatment, etc. The sludge organic acids are only slightly soluble in hydrocarbon oils, but are highly water-soluble. The free acids in aqueous solutions are dark green in color, and are generally referred to as green sulphonic acids.

The fuming sulphuric acid treatment simultaneously produces other types of sulphonic acids which are predominantly oil soluble, and may be found in the supernatant oil to the extent of a few percent. These acids impart a reddish color to the oil containing the same, and are generally referred to as mahogany sulphonic acids. The mahogany sulphonic acids may be removed from the oil by extraction with an aqueous solution of a solvent, such as a solution containing 40%–60% of alcohol and from 60%–40% of water.

In practice, the oil is given several treatments with fuming sulphuric acid, for example five or more of such treatments, the acid sludges are removed after each treatment, and the mahogany sulphonic acids and the slight amounts of green sulphonic acids dissolved in the oil after the final treatment are removed by treatment with the aqueous solution of a solvent. The solvent extract is removed and the oil is finally filtered to obtain a white medicinal oil.

We have discovered that the objectionable sulphur containing compounds, such as the green and mahogany sulphonic acids, may be easily removed from the acidified oil by heating the oil at from 290° F. to just below the decomposition point of the oil. The decomposition temperature will depend upon the relative amount of free sulphuric acid or anhydride present in the oil. As a result of the heat treatment, sulphur containing compounds are substantially completely decomposed into an easily filterable suspension of coagulated carbonaceous matter, $SO_2$ being given off as a vapor. The invention may be carried out by subjecting a viscous mineral oil to the action of fuming sulphuric acid, and preferably by repeated treatments at an elevated temperature, for example 140° F., and removing the acid sludge formed after each treatment. The acidified oil obtained after the last acid treatment is heated to 290° F., or higher, for a period of time sufficient to effect decomposition of the mahogany and green sulphonic acids with the formation of a suspension of coagulated carbonaceous matter. The carbonaceous matter is filtered from the oil, and the oil is further treated to obtain a pure white medicinal oil of very high stability.

The medicinal oils according to this invention are highly resistant to deterioration, and do not discolor or acquire a bad odor upon storage and exposure to heat or light.

We claim:—

1. Process of preparing a medicinal white oil which comprises mixing a viscous mineral oil with 3 to 20% by volume of fuming sulphuric acid under sulphonating conditions adapted to form a sludge, and a remainder of hydrocarbon oil containing mahogany sulphonic acids and green sulphonic acids, separating said hydrocarbon oil from said sludge, thereafter without prior neutralization heating said hydrocarbon oil at from 290° F. to just below the decomposition point of said oil for a period of time sufficient to effect decomposition of said mahogany sulphonic acids and green sulphonic acids and precipitation of the carbonaceous material formed as a result of said decomposition, removing said carbonaceous material, and recovering a white oil of high stability.

2. Process for preparing a medicinal white oil which comprises removing from a viscous mineral oil the major part of the constituents of said viscous mineral oil which are reactable with fuming sulphuric acid by repeatedly contacting such viscous mineral oil with successive batches of 3 to 20% by volume of fuming sulphuric acid under sulphonating conditions adapted to form sludges, and a remainder of hydrocarbon oil containing mahogany sulphonic acids and green sulphonic acids, separating said hydrocarbon oil from said sludges, thereafter without prior neutralization heating said hydrocarbon oil at from 290° F. to just below the decomposition point of said hydrocarbon oil for a period of time sufficient to effect decomposition of said mahogany sulphonic and green sulphonic acids and precipitation of the carbonaceous material formed as a result of said decomposition, removing said carbonaceous material and recovering a white oil of high stability.

MANUEL BLUMER.
LEO SALZMANN.